(12) United States Patent
Schiffers

(10) Patent No.: US 10,611,071 B2
(45) Date of Patent: Apr. 7, 2020

(54) METHOD FOR EVALUATING PROCESS CHARACTERISTICS OF INJECTION-MOLDING TOOLS

(71) Applicant: KRAUSSMAFFEI TECHNOLOGIES GMBH, München (DE)

(72) Inventor: Reinhard Schiffers, München (DE)

(73) Assignee: KRAUSSMAFFEI TECHNOLOGIES, München (DE)

( * ) Notice: Subject to any disclaimer, the term of this patent is extended or adjusted under 35 U.S.C. 154(b) by 910 days.

(21) Appl. No.: 15/028,607

(22) PCT Filed: Oct. 14, 2014

(86) PCT No.: PCT/EP2014/071991
§ 371 (c)(1),
(2) Date: Apr. 11, 2016

(87) PCT Pub. No.: WO2015/055636
PCT Pub. Date: Apr. 23, 2015

(65) Prior Publication Data
US 2016/0229101 A1    Aug. 11, 2016

(30) Foreign Application Priority Data
Oct. 14, 2013 (DE) .................. 10 2013 111 328

(51) Int. Cl.
*B29C 45/50* (2006.01)
*B29C 45/76* (2006.01)
(Continued)

(52) U.S. Cl.
CPC .............. *B29C 45/77* (2013.01); *B29C 45/26* (2013.01); *B29C 45/76* (2013.01);
(Continued)

(58) Field of Classification Search
CPC ....... B29C 45/76; B29C 45/77; B29C 45/776; B29C 2945/76006; B29C 2945/76083;
(Continued)

(56) References Cited

U.S. PATENT DOCUMENTS 5,738,809 A      4/1998 Hara et al.
2009/0194897 A1*  8/2009 Sugiyama ............... B29C 45/50
                                                264/40.5

FOREIGN PATENT DOCUMENTS

EP          1 166 994         1/2002

OTHER PUBLICATIONS

Sheth, Himanshu R. "An Adaptive Control Methodology for the Injection Molding Process. Part 1: Material Data Generation", Journal of Injection Molding Technology, Society of Plastics Engineers, Brookfield, CT, US; 1998; pp. 86-94.*
(Continued)

*Primary Examiner* — Philip C Tucker
*Assistant Examiner* — Brian R Slawski
(74) *Attorney, Agent, or Firm* — Henry M. Feiereisen LLC

(57) ABSTRACT

The invention relates to a method for qualitatively and/or quantitatively classifying injection-molding tools in tool categories and determining preferred intervention ranges and/or manipulated variables for adapting injection-molding machine parameters in the case of changing ambient conditions and/or determining the influence of disturbing effects on the injection-molding process, comprising the following steps: a) providing an injection-molding machine having the injection-molding tool which is to be classified and which is intended for the determination, b) performing at least one injection-molding cycle with injection-molding machine settings in order to obtain a qualitatively adequate injection-molding part, c) determining a quotient $Q=\Delta p/\Delta s$ or $Q=\Delta sn/$
(Continued)

Δse characterizing the tool from c.1) a pressure rise Δp during the compression phase of the injection-molding cycle and the melt volume ΔV displaced during the compression phase or c.2) a melt volume ΔVn displaced during the holding-pressure phase and the melt volume ΔVe displaced during the injection phase, wherein c.3) the corresponding screw travel Δs, Δsn, and Δse is measured in order to determine the displaced volumes ΔV, ΔVn, and Δ; Ve, d) providing at least one limit value (G1 ... Gx ... Gn), wherein one or more recommendations for preferred intervention ranges or manipulated variables for adapting adjustment parameters of the injection-molding machine are associated with ranges (Q<G1; G1<Q<G2; ... Gn-1<Q<Gn; Q>Gn) for the values of the quotient Q, e) determining in which of the ranges (Q<G1; G1<Q<G2; ... Gn-1<Q<Gn; Q>Gn) the value of the quotient Q lies, and f) outputting the preferred intervention ranges and/or manipulated variables for adapting the machine parameters of the injection-molding machine which are associated with the determined range.

10 Claims, 2 Drawing Sheets

(51) Int. Cl.
*B29C 45/77* (2006.01)
*B29C 45/26* (2006.01)

(52) U.S. Cl.
CPC .......... *B29C 45/7646* (2013.01); *B29C 45/50* (2013.01); *B29C 45/7693* (2013.01); *B29C 2045/776* (2013.01); *B29C 2945/76006* (2013.01); *B29C 2945/76083* (2013.01); *B29C 2945/76187* (2013.01); *B29C 2945/76498* (2013.01); *B29C 2945/76882* (2013.01)

(58) Field of Classification Search
CPC .. B29C 2945/7609; B29C 2945/76096; B29C 2945/76187; B29C 45/47; B29C 45/50; B29C 45/7693; B29C 2945/76665; B29C 2045/776
USPC ..... 264/40.1, 40.4, 40.5, 40.7, 328.1, 328.9; 425/135, 145, 147, 149, 162, 167, 169, 425/170, 171, 172, 542, 555
See application file for complete search history.

(56) References Cited

OTHER PUBLICATIONS

International Search Report issued by the European Patent Office in International Application PCT/EP2014/071991.
Himanshu R. Sheth: "An Adaptive Control Methodology for the Injection Molding Process. Part 1: Material Data Generation", Journal of Injection Molding Technology, Society of Plastics Engineers, Brookfield, CT, US; 1998; pp. 86-94.

* cited by examiner

METHOD FOR EVALUATING PROCESS CHARACTERISTICS OF INJECTION-MOLDING TOOLS

CROSS-REFERENCES TO RELATED APPLICATIONS

This application is the U.S. National Stage of International Application No. PCT/EP2014/071991, filed Oct. 14, 2014, which designated the United States and has been published as International Publication No. WO 2015/055636 and which claims the priority of German Patent Application, Serial No. 10 2013 111 328.1, filed Oct. 14, 2013, pursuant to 35 U.S.C. 119(a)-(d).

BACKGROUND OF THE INVENTION

The invention relates to a method for evaluating process characteristics of injection-molding tools in the sense of qualitatively and/or quantitatively classifying injection-molding tools in tool categories. Building thereon, a determining of preferred intervention ranges and/or manipulated variables is presented for adapting injection molding machine parameters in the case of changing ambient conditions and/or determining the influence of disturbing effects on an injection-molding process.

An ideally adjusted injection-molding process of an injection-molding machine with a particular tool for the production of a particular shaped part is subject, in cyclic operation, in reality to fluctuations continuously, which are due to changing ambient conditions and/or to the influence of disturbing effects on the injection-molding process. Such changing ambient conditions can be, for example:

changing hall temperature in the factory hall, in which the injection-molding machine is set up. Thereby, changed heat loss flows from the tool or from the heating devices of the injection-molding machine into the environment can occur, which in turn can have a direct influence on the temperature of the melt and therefore on its viscosity.

quality fluctuations of the raw material which is to be processed, wherein fiber content, humidity or regranulate content of the raw material can change for example from load to load, which likewise can bring about viscosity changes to the melt with fixedly pre-set injection-molding machine parameters.

Hereby, considerable quality deviations of the produced shaped parts can occur. For example, an overfilling, i.e. an over-injecting, of the molding tool can occur, which on the one hand brings about undesired burrs on the shaped part and on the other hand can lead to damage to the molding tool. On the other hand, it can lead to a defective filling of the mold, which presents itself by shaped parts which are not completely molded, which likewise during the further procedure are to be categorized as rejects when the required quality standards are no longer achieved.

In order to compensate effects of changing viscosity of the melt over time, it is known to adapt the holding-pressure level on the basis of a pressure measurement in the tool cavity. Furthermore, it is known, for correction of changing viscosities, to adapt the moment and/or the position of the switchover from the injection phase into the holding-pressure phase, i.e. the establishing of the so-called switchover point. In the prior art, it is necessary here in both the above-mentioned methods, that an experienced, i.e. intensively trained machine operator firstly determines the type of the suitable intervention ranges and/or the suitable manipulated variables on the basis of the knowledge of the part which is to be produced and thereby on the basis of the knowledge of the tool cavity and its characteristics. In a second step, the experienced machine operator is required, after he has selected a suitable type of manipulated values or intervention ranges which are to be influenced, additionally on the basis of his experience to establish the extent of the intervention or the extent of the changes which are to be carried out, in order to again obtain a qualitatively good shaped part. This is founded in that the expedient selection of intervention ranges and/or manipulated variables and also an extent of a respective intervention is highly dependent on the geometry of a respective part which is to be produced, for example a very thin-walled or a rather thick-walled shaped part and the quality fluctuation of the raw material and/or of the raw material type. Thus, for example, in the case of a relatively thin-walled component, i.e. in the case of a relatively thin-walled tool cavity, in which solidification processes of the melt occur very quickly, it is little effective to increase the holding pressure or to extend the holding pressure duration. Rather, the injection speed is more promising here for an expedient selection of the intervention range, in order to ensure that the molding tool is filled as completely as possible or the filling volume is withdrawn somewhat in the case of an over-injecting.

For such a change to the injection-molding machine parameters and their basic selection, an experienced machine operator is imperatively necessary in the prior art, who, on the basis of his knowledge and skill selects constructive intervention ranges and/or manipulated variables and corrects these with regard to their extent. It is disadvantageous here that a complete automation of the injection-molding process is not possible, because in the case of changing ambient conditions or the occurrence or influence of disturbing effects on the injection-molding process an intervention by an experienced machine operator is imperatively necessary.

As a basis for an optimizing intervention, inter alia a pressure measurement is carried out in the tool cavity. However, this has the result that an additional pressure sensor is required in the tool cavity. With regard to such a pressure sensor, it has been found that the latter, on the one hand, is cost-intensive to install and produces high maintenance requirements within the tool maintenance.

SUMMARY OF THE INVENTION

It is therefore an object of the invention to indicate a method for qualitatively and/or quantitatively classifying injection-molding tools in tool categories and for determining preferred intervention ranges and/or manipulated variables for adapting injection-molding machine parameters in the case of changing ambient conditions and/or determining the influence of disturbing effects on the injection-molding process, which can be operated in an automated or semi-automated manner. Furthermore, it is an object of the invention to achieve the success according to the invention, wherein characteristic values of an injection-molding process can be determined and utilized in a simple manner, i.e. on the basis of values of an injection-molding machine usually detected metrologically.

These problems are solved by a method, as set forth hereinafter. Advantageous embodiments are indicated in the subclaims.

It is thus to be made possible to operate an injection-molding machine in cyclic operation as far as possible without monitoring or correcting intervention by an experienced machine operator.

According to the invention, it was recognized that for the automatic or semi-automatic operation of the injection-molding process for a particular tool or for different tool geometries a skillful selection of the manipulated variables and/or of the intervention ranges and their correction value is to take place without the assistance of an experienced machine operator. For this, the invention provides a method in which the relevant characteristics of the injection-molding tool are derived from process parameters of the injection-molding machine in cyclic operation. According to the invention, it was recognized that a particular characteristic number in the form of a quotient Q of a pressure rise $\Delta p$, for example the tool internal pressure or the melt pressure in the compression phase of the injection-molding process at the end of the injection phase is suitable as numerator and the melt volume $\Delta V$ displaced in this time window, i.e. during the compression phase at the end of the injection phase, is suitable as characteristic number in the denominator. The melt volume $\Delta V$ displaced during the compression phase of the injection-molding cycle can be determined in a simple manner via the corresponding screw travel $\Delta s$. The pressure rise $\Delta p$ during the compression phase of the injection-molding process can, if a pressure sensor is present in the tool cavity, be determined via the tool internal pressure or via the melt pressure in an injection device of the injection-molding machine.

Alternatively, a suitable quotient Q can be determined from the ratio of the volume $\Delta V_n$ displaced in the holding-pressure phase measured via the screw travel $\Delta s_n$ in the holding-pressure phase and the volume $\Delta V_e$ displaced in the injection phase measured via the screw travel $\Delta s_e$ in the injection phase. Instead of a travel change $\Delta s_n$, also a speed change derived therefrom can be monitored, because both quantities can be converted into one another. Thus, for example, in a first molding tool which is provided for the production of a thinner-walled component, the quotient Q of the pressure rise $\Delta p$ and the displaced melt volume $\Delta V$, i.e. converted to the corresponding screw travel $\Delta s$ covered in the determining of the displaced volumes, the quotient $Q=\Delta p/\Delta s$ is greater than in the case of a tool which is to produce, rather, thicker-walled components.

In a good part process, work is carried out with a constant volume in the injection phase, so that up to reaching the switchover point a respectively necessary mold filling must be achieved. The more volume $\Delta V_n$ is displaced in the holding-pressure phase in relation to the volume $\Delta V_e$ in the injection phase, the more one is to proceed from a thicker-walled basic characteristic of the shaped part and therefore of the molding tool, so that it results herefrom that the greater the quotient $Q=\Delta s_n/\Delta s_e$, the more the tool characteristic, i.e. the tool category, corresponds to a thicker-walled component. For example, it can be concluded therefrom that the thicker-walled the component is, it makes more and more sense to intervene in a correcting manner in the holding-pressure phase and with an increasing $Q=\Delta s_n/\Delta s_e$ to also select the extent of the intervention to be greater for the adaptation of the injection-molding machine parameters. By means of these quotients $Q=\Delta p/\Delta s$ or $Q=\Delta s_n/\Delta s_e$ therefore a fundamental decision can be made in which intervention range, i.e. for example in the injection phase, in the compression phase or in the holding-pressure phase, a successful adaptation of the injection-molding machine parameters is most promising and/or in a second evaluation step the extent of the adaptation of these injection-molding machine parameters which are to be carried out are determined.

Here, according to the invention, for the values of the quotient Q at least one limit value $(G_1; \ldots; G_x; \ldots; G_n)$ is provided, wherein by means of these limit values it is determined whether the value of the quotient Q is less than or equal to the limit value $G_1$ or greater than the limit value $G_n$ or lies in a range therebetween, in particular between two limit values $G_{n-1}$ and $G_n$. According to the invention, one or more recommendations for preferred intervention ranges or manipulated variables for adaptation of adjustment parameters of the injection-molding machine are associated with these ranges, which are separated from one another by the establishing of the provided limit values $(G_1; \ldots; G_n)$. When such a decision matrix, i.e. established limit values $(G_1; \ldots; G_n)$, and the ranges defined hereby, is present, it can be determined in which of the ranges the value of the quotient Q lies.

Subsequently, a preferred intervention range associated with the determined range and/or a preferred measurement for the change of the manipulated variable for adaptation of the machine parameters of the injection-molding machine can be outputted. In a semi-automatic operation, this can take place for example on a display such that even an inexperienced machine operator merely transfers into the machine control the values suggested by the machine itself, without having to make a technical decision himself in this respect. In a fully automatic operation, the outputting of the preferred intervention ranges associated with the determined range and/or the measurement for the change of the manipulated values can also be outputted directly to a machine control, by means of which then in the next injection-molding cycle corrected injection-molding machine parameters come into use.

The determining of the quotient $Q=\Delta p/\Delta s$ or $Q=\Delta s_n/\Delta s_e$ characterizing as tool and/or characterizing as raw material according to the invention, takes place by measurement during at least one injection-molding cycle with injection-molding machine settings in order to obtain a qualitatively adequate injection-molding part with the tool and/or raw material which is to be evaluated. For this, an injection-molding machine is provided having the injection-molding tool which is to be classified and is provided for determining, and/or the raw material is made available which is to be characterized and provided for determining.

Therefore, the method according to the invention for qualitatively and/or quantitatively classifying injection-molding tools in tool categories and for determining preferred intervention ranges and/or manipulated variables for adapting injection-molding machine parameters in the case of changing ambient conditions and/or determining the influence of disturbing effects on the injection-molding process is distinguished by the following steps:
 a) providing an injection-molding machine having the injection-molding tool which is to be classified and which is intended for the determination,
 b) performing at least one injection-molding cycle with injection-molding machine settings in order to obtain a qualitatively adequate injection-molding part,
 c) determining a quotient $Q=\Delta p/\Delta s$ or $Q=\Delta s_n/\Delta s_e$ characterizing the respective tool from
  c.1) a pressure rise $\Delta p$ during the compression phase of the injection-molding cycle and the melt volume $\Delta V$ displaced during the compression phase or
  c.2) a melt volume $\Delta V_n$, displaced during the holding-pressure phase and the melt volume $\Delta V_e$, displaced during the injection phase, wherein c.3) the corresponding screw travel $\Delta s$, $\Delta s_n$ and $\Delta s_e$ is measured in order to determine the displaced volumes $\Delta V$, $\Delta V_n$ and $\Delta V_e$, d) providing at least one limit value ($G_1 \ldots G_x \ldots G_n$), wherein one or more recommendations for preferred intervention ranges or manipulated variables for adapting adjustment parameters of the injection-molding machine are associated with ranges ($Q \leq G_1$; $G_1 < Q \leq G_2$; $G_{n-1} < Q \leq G_n$; $Q > G_n$) for the values of the quotient Q, e) determining in which of the ranges ($Q \leq G_1$; $G_1 < Q \leq G_2$; $G_{n-1} < Q \leq G_n$, $Q > G_n$) the value of the quotient Q lies, and f) outputting the preferred intervention ranges and/or manipulated variables for adapting the machine parameters of the injection-molding machine which are associated with the determined range.

In a preferred embodiment, for determining the pressure rise $\Delta p$ the course of the melt pressure or of the tool internal pressure is measured. For the case where the course of the melt pressure is measured, the pressure sensor in the tool cavity, described as disadvantageous in the introduction, can be dispensed with. Of course, the method according to the invention can also be carried out via the measurement of the tool internal pressure, for example in tools which already have a tool internal pressure sensor.

In a further embodiment of the method according to the invention, a correction factor $K_{dyn}$ is provided or determined, by means of which the value of the quotient Q is corrected by dynamically caused changes of the value for Q, for example by an influence of the injection speed. Such correction factors can be provided on the knowledge and experience of experienced machine operators. Nevertheless, these correction factors $K_{dyn}$ can also be determined from machine parameters during the carrying out of the at least one injection-molding cycle with injection-molding machine settings in order to obtain a qualitatively adequate injection-molding part.

In order to take into consideration dynamic effects in the calculation of the quotient $Q = \Delta p / \Delta s$ or $Q = \Delta s_n / \Delta s_e$, for example the injection speed of the melt into the tool can also be taken into consideration as a weighting factor. In order to also include further marginal conditions, which have a decisive influence on the injection-molding process, further process parameters which are usual on injection-molding machines, for example temperatures of the cylinder and of the tool, pressure and/or forces in different process phases, for example the injection phase, the compression phase and/or the holding-pressure phase or energy characteristic factors such as for example a flow figure for the relative description of the flowability of the raw material which is currently to be processed can also be incorporated into the evaluation and the determining of the correction factor $K_{dyn}$.

According to an advantageous embodiment of the invention, the injection phase, the compression phase or the holding-pressure phase of the injection-molding cycle present themselves as recommended intervention ranges.

Preferably the switchover point as a function of the screw position and/or the switchover point as a function of the injection pressure and/or the switchover point as a function of time and/or the holding pressure level and/or the holding pressure time and/or the injection speed and/or the cylinder temperature and/or the tool temperature can be preferred as preferred manipulated variables on which influence is exerted qualitatively and/or quantitatively according to the invention.

Expediently, the outputting of the recommendation for the preferred intervention ranges and/or of the manipulated variables takes place on a display in the case of a desired semi-automatic operation or the outputting of one or more recommendations for the intervention ranges and/or of the manipulated variables takes place into a storage facility as input value for an injection-molding machine control.

In so far as for a range ($Q \leq G_1$; $G_1 < Q < G_2$; $\ldots G_{n-1} < Q < G_n$, $Q > G_n$) expediently several advantageous/recommended intervention ranges and/or manipulated variables come into consideration, it is expedient according to a preferred embodiment of the invention to associate with these several intervention ranges and/or manipulated variables coming into consideration priorities according to a measure of their correcting effect of a change of the intervention range and/or of the manipulated variable on the injection-molding cycle. Furthermore, it is then expedient to output the recommendations of the preferred intervention ranges and/or manipulated variables weighted with regard to their correcting effect and, if applicable, weighted in their priority.

In so far as a concrete numerical value or a range indication are able to be determined additionally for the qualitative selection of the intervention ranges and/or of the manipulated variables for correction values of the intervention ranges/manipulated variables, according to an advantageous embodiment of the invention also the correction values and/or expedient correction ranges are outputted.

It is advantageous here that the correction values, in particular the change values of the manipulated values and/or the definitions of the intervention ranges and/or the values for the priorities and/or the values for the correcting effects of the manipulated values on the injection-molding cycle are determined empirically and are provided deposited in a data bank.

Furthermore, the establishing of the limit values $G_1 \ldots G_n$ and the association of one or more recommendations for preferred intervention ranges or manipulated variables to the ranges ($Q \leq G_1$; $G_1 < Q < G_2$; $\ldots G_{n-1} < Q < G_n$, $Q > G_n$) preferably takes place expediently on the basis of the knowledge of an experienced machine operator, preferably during the carrying out of the at least one injection-molding cycle with injection-molding machine settings in order to obtain a qualitatively adequate injection-molding part. The empirical values of the experienced machine operator are likewise deposited here in a data bank and are therefore held available for a future cycle operation of the injection-molding machine with the particular tool. These empirical values can be stored with the machine data set. When the tool is to be run on another injection-molding machine, this secured data set is simply retrieved again. This has the advantage that the knowledge and experience of the experienced machine operator is only required the first time that the tool is installed on the injection-molding machine. Future process changes and adaptations of the injection-molding parameters to changing ambient conditions and/or the influence of disturbing effects on the injection-molding process can then take place without special knowledge of an experienced machine operator on the basis of the empirical values in the data bank. Therefore, according to the invention, it is no longer necessary during the production of a plurality of shaped parts of a particular component to permanently hold experienced and trained machine operators available in order to be able to counterbalance short-term disturbing effects on the injection-molding process or changing ambient conditions. Therefore, according to the invention, a substantial contribution to the consistency of the shaped part quality is guaranteed also under changing ambient conditions or in the case of the occurrence of disturbing effects. Furthermore, via the establishing according to the invention of the quotients Q=Δp/Δs or Q=Δs$_n$/Δs$_e$ after a tool characterization has taken place or respectively a classifying of a tool in a particular tool category, for example thin-walled or thick-walled, fluctuations in raw material quality can be successfully detected automatically and counteracted by the selection of suitable intervention ranges or manipulated variables.

BRIEF DESCRIPTION OF THE DRAWING

The invention is explained in further detail below with the aid of the enclosed drawings. There are shown in diagrammatic illustration.

DETAILED DESCRIPTION OF PREFERRED EMBODIMENTS

Figure 1:
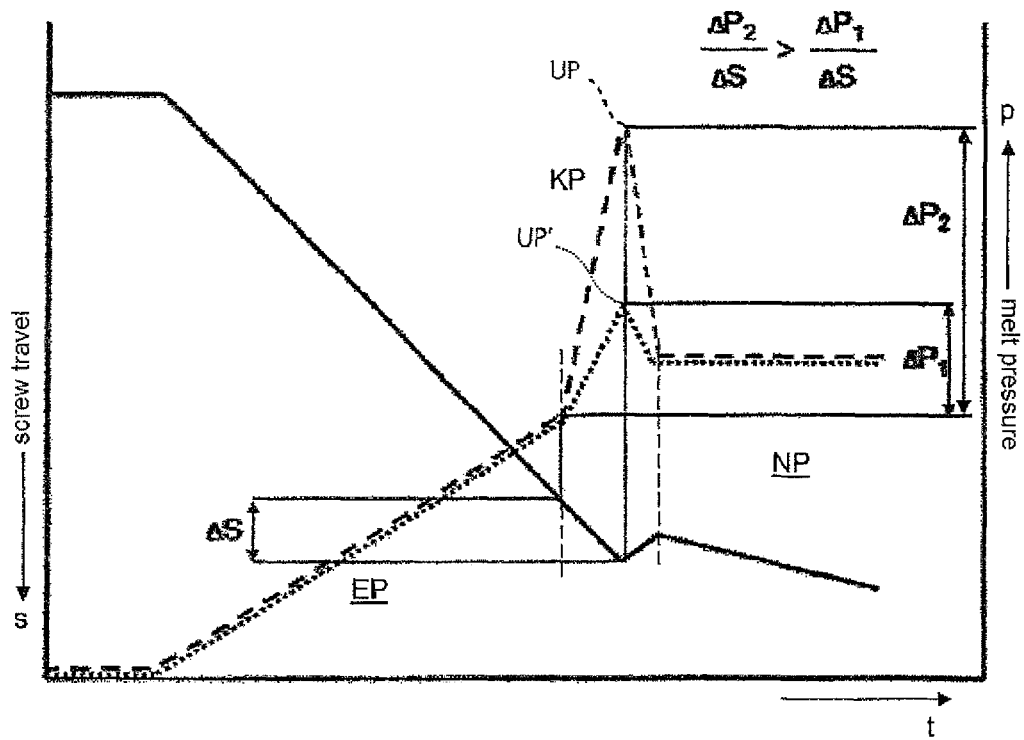
FIG. 1: a diagram for determining the quotient Q=Δp/Δs with the aid of a typical course of the screw travel and of the melt pressure over time of an injection-molding machine (Alternative 1 of the invention)

The sketched diagram of FIG. 1 shows over an injection-molding cycle on an injection-molding tool a chronological course of a screw travel s and of a melt pressure p. The individual phases are described briefly below, in order to then be able to indicate tool-specific characteristics:

In an injection phase EP with a start at a time t$_o$ an injection unit of an injection-molding machine is moved to a clamping unit of a tool and is pressed with an outlet of the injection unit in the form of a nozzle on the tool. A screw of the injection-molding machine is now moved over a particular screw travel s in the direction of the nozzle, so that a prepared melt is pressed under high pressure p through the opened nozzle and a sprue of the injection-molding tool into a shaping cavity. During this injection phase EP, the screw is moved with approximately constant speed, which results in a likewise approximately constant rise of the pressure p, as illustrated in FIG. 1.

A distinct rise in the pressure increase characterizes the transition from the injection phase EP into a compression phase KP. Here, the tool or respectively a cavity of the tool is already largely filled. This phase is terminated on reaching a so-called switchover point P, at which a switchover takes place from a travel control to a pressure control.

The cavity of the tool is now in fact filled with plasticized plastic material on reaching of the switchover point P, but as the tool, with typically 20 to 120° C., is colder than the injected plastic material, heated to approximately 200 to 300° C., the plastic material cools down in the mold and solidifies on reaching a freezing point. The cooling is accompanied here by a volume contraction, which can have a very disadvantageous effect on a dimensional accuracy and a surface quality of the workpiece which is to be produced. In order to compensate this contraction as far as possible, a reduced pressure is also maintained after filling of the cavity of the tool, so that as compensation for the contraction there can be afterflow of plasticized plastic material into the cavity.

To adjust a holding pressure to a lower pressure level compared to the compression phase KP, the screw is stopped and moved back a little, in order to then be moved generally linearly again according to the required pressure level and the plastic emerging into the cavity accordingly.

Already with the aid of the course of the pressure p(t), thinner-walled shaped parts can basically be differentiated from rather more thick-walled shaped parts. In FIG. 1 a curve, drawn in dashed lines, shows a basic pressure course in the production of a rather more thin-walled shaped part, and a line drawn by dots shows a pressure course of a rather more thick-walled shaped part, to illustrate characteristic differences. A pressure rise Δp$_2$ in the compression phase KP occurs distinctly higher in the case of a rather more thin-walled shaped part than a pressure rise Δp$_1$ of a rather more thick-walled shaped part. Thereby, there results as characteristic feature Q in relation to a screw travel distance Δs travelled respectively during the compression phase KP:

$$\frac{\Delta p_2}{\Delta s} > \frac{\Delta p_1}{\Delta s}$$

Figure 2:
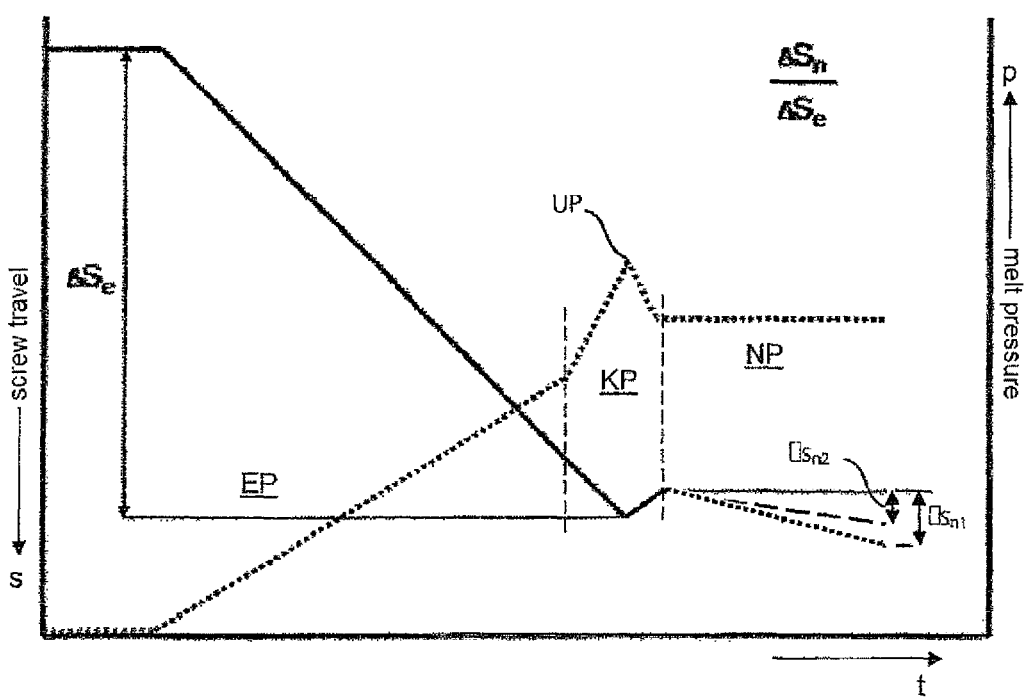
FIG. 2: a diagram for determining the quotient Q=Δs$_n$/Δs$_e$ with the aid of a typical diagram of the screw travel s and of the melt pressure p over time t in a particular injection-molding process

However, rather more thick-walled shaped parts also differ from rather more thin-walled ones in the holding-pressure phase, as sketched in FIG. 2. As the injected plastic material solidifies rather in rather more thin-walled shaped parts, in the holding-pressure phase NP with constant holding pressure not so much additional material can be pressed into the cavity. This is reflected in a distinctly small screw travel distance Δs$_n$. In FIG. 2 a rather more thick-walled shaped part is illustrated by way of example by a curve drawn in dashed lines, a rather more thin-walled one by a line, drawn by dots, in the holding-pressure phase NP. Thus, here also there results as characteristic feature Q in relation to a screw travel distance Δs$_e$ travelled respectively during the injection phase EP:

$$\frac{\Delta s_{n1}}{\Delta s_e} > \frac{\Delta s_{n2}}{\Delta s_e}$$

The respective characteristic features Q therefore express characteristics of the tool or respectively of the cavity. Purely with the aid of their absolute quantity or of their quantity relationship, it is therefore to be deduced thereupon whether a tool can produce rather more thick-walled or rather more thin-walled shaped parts.

Via the characteristic numbers Q therefore also methods for the correction of raw material quality fluctuations can also be operated in an automated manner, wherein necessary inputs by experienced machine operators are no longer necessary. Via the characteristic numbers, requirements concerning control technology of different tools can be determined and on this basis machine-internal regulation parameters can be adapted. Thus, the injection axis of an injection-molding machine can always be operated with the best dynamics and reproducibility in accordance with the specific requirements.

Figure 3:
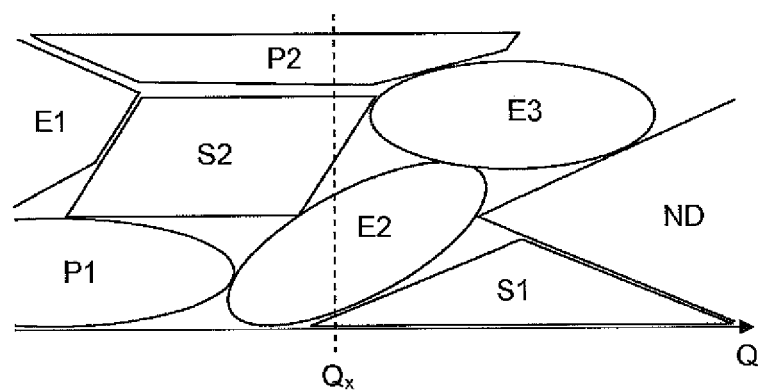
FIG. 3: an exemplary illustration of intervention ranges and manipulated variables over the characteristic number Q as parameter.

FIG. 3 presents a sketch of intervention ranges and manipulated variables which basically come into consideration here for the correcting adaptation during the operation of a tool on an injection-molding machine. This graphic represents a data bank with empirical values, in which with the aid of an arrangement over the characteristic number Q as parameter for a fixed value Q$_x$ it can be seen that from a total number of possibilities for a tool currently present with this value Q$_x$ only 4 intervention ranges and/or manipulated variables are relevant or are the most promising, namely here as an example S1, E2, S2 and P2. Here, a respective quantity of a section through an illustrated field can be regarded as an indication for its influence on a possible improvement to the production result. Therefore, also a suggestion is delivered, in which sequence optimization measures should be taken.

In a simple manner, therefore, an indication is given as to possible optimizations and settings, without the tool itself having to be examined intensively by a specialist.

What is claimed is:

1. A method for qualitatively and/or quantitatively classifying injection-molding tools in tool categories and for determining preferred intervention ranges and/or manipulated variables for adapting injection-molding machine parameters during changing ambient conditions and/or determining an influence of undesirable effects on an injection-molding process, said method comprising the steps of:

performing at least one injection-molding cycle of an injection-molding machine, having an injection-molding tool to be classified and to be determined, with injection-molding machine settings to obtain a usable injection-molding part;

determining a quotient $Q=\Delta p/\Delta s$ or $Q=\Delta s_n/\Delta s_e$ characterizing the injection-molding tool in one of two ways, a first way in which the quotient Q is determined from a pressure rise $\Delta p$ during a compression phase of the at least one injection-molding cycle and a melt volume $\Delta V$ displaced during the compression phase, a second way in which the quotient Q is determined from a melt volume $\Delta V_n$, displaced during a holding-pressure phase and a melt volume $\Delta V_e$, displaced during an injection phase, wherein a corresponding screw travel $\Delta s$, $\Delta s_n$ and $\Delta s_e$ is measured in order to determine the displaced volumes $\Delta V$, $\Delta V_n$ and $\Delta V_e$;

providing at least one limit value $G_1 \ldots G_x \ldots G_n$, wherein one or more recommendations for preferred intervention ranges and/or manipulated variables for adapting adjustment parameters of the injection-molding machine are associated with ranges $Q \leq G_1$; $G_1 < Q \leq G_2$; $\ldots G_{n-1} < Q \leq G_n$, $Q > G_n$ for values of the quotient Q;

determining in which of the ranges $Q \leq G_1$; $G_1 < Q < G_2$; $\ldots G_{n-1} < Q < G_n$, $Q > G_n$ a value of the quotient Q lies; and outputting the preferred intervention ranges and/or manipulated variables for adapting the machine parameters of the injection-molding machine which are associated with the determined range, wherein in a semi-automatic operation, the outputting takes places on a display and a machine operator transfers into a machine control values suggested by the injection-molding machine, or in a fully-automatic operation, the outputting takes place directly to the machine control whereby a next injection molding cycle is carried out with the adapted injection-molding machine parameters.

2. The method of claim 1, wherein the pressure rise $\Delta p$ is determined by measuring a course of a melt pressure or of a tool internal pressure.

3. The method of claim 1, further comprising determining a correction factor to correct a value for the quotient Q by dynamically caused changes of the value for the quotient Q characterizing a respective tool by an influence of an injection speed.

4. The method of claim 1, wherein recommended intervention ranges are the injection phase, the compression phase or the holding-pressure phase of the at least one injection-molding cycle.

5. The method of claim 1, wherein the manipulated variables are a switchover point as a function of a screw position and/or a switchover point as a function of an injection pressure and/or a switchover point as a function of time and/or a holding pressure level and/or a holding pressure time and/or an injection speed and/or a cylinder temperature and/or a tool temperature.

6. The method of claim 1, further comprising associating with the intervention ranges and/or manipulated variables as a function of the ranges $Q \leq G_1$; $G_1 < Q \leq G_2$; $\ldots G_{n-1} < Q \leq G_n$, $Q > G_n$ priorities for a measure of a correcting effect of a change of the intervention ranges and/or of the manipulated variables on the injection-molding cycle, wherein the recommendations of the preferred intervention ranges and/or manipulated variables are outputted weighted with regard to the correcting effect and weighted in priority.

7. The method of claim 1, wherein in addition to a qualitative selection of the intervention ranges and/or of the manipulated variables, correction values are outputted for the intervention ranges and/or manipulated variables.

8. The method of claim 7, wherein the correction values are determined empirically and deposited in a data bank.

9. The method of claim 7, wherein the correction values change values for the manipulated variables and/or definitions of the intervention ranges and/or values for priorities and/or values for correcting effects of the manipulated variables on the at least one injection-molding cycle.

10. The method of claim 7, further comprising establishing a B characteristic diagram from the preferred intervention ranges and/or the manipulated variables and/or priorities thereof and/or the correction values thereof, and determining as a function of the quotient Q a suitable point of the characteristic diagram, wherein the correction values and/or recommendations associated with the determined point of the characteristic diagram are outputted and/or are deposited in a memory.

* * * * *